United States Patent
Zhang (10) Patent No.: US 9,928,807 B2
(45) Date of Patent: Mar. 27, 2018

(54) CONTROL METHOD, CONTROL DEVICE AND ELECTRONIC APPARATUS

(71) Applicants: Beijing Lenovo Software Ltd., Beijing (CN); Lenovo (Beijing) Co., Ltd., Beijing (CN)

(72) Inventor: Shoupeng Zhang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 13 days.

(21) Appl. No.: 14/973,799

(22) Filed: Dec. 18, 2015

(65) Prior Publication Data

US 2017/0039996 A1 Feb. 9, 2017

(30) Foreign Application Priority Data

Aug. 3, 2015 (CN) .......................... 2015 1 0479311

(51) Int. Cl.
    G09G 5/02    (2006.01)
    G09G 5/10    (2006.01)
    G09G 5/00    (2006.01)
    G09G 1/00    (2006.01)
    H04N 1/60    (2006.01)
    (Continued)

(52) U.S. Cl.
    CPC ............. G09G 5/10 (2013.01); G06F 3/1423 (2013.01); G09G 2320/0626 (2013.01); G09G 2320/0666 (2013.01); G09G 2360/145 (2013.01)

(58) Field of Classification Search
    CPC combination set(s) only.
    See application file for complete search history.

(56) References Cited

U.S. PATENT DOCUMENTS 8,195,243 B2   6/2012   Kim et al.
8,249,662 B2   8/2012   Kim et al.
(Continued)

FOREIGN PATENT DOCUMENTS

CN       1591523 A     3/2005
CN     102541338 A     7/2012
(Continued)

OTHER PUBLICATIONS

First Chinese Office Action regarding Application No. 201510479311.5 dated Sep. 29, 2017. English translation provided by http://globaldossier.uspto.gov.

*Primary Examiner* — Wesner Sajous
(74) *Attorney, Agent, or Firm* — Harness, Dickey & Pierce, P.L.C.

(57) ABSTRACT

A control method applied to an electronic apparatus is disclosed. The electronic apparatus includes a display unit arranged on a first surface and a display unit arranged on a second surface, and inherent light transmittances of the display units are greater than a predetermined value. The control method includes: determining a first display unit and a second display unit, where the first display unit is a display unit arranged on a surface facing a user, and the second display unit is a display unit arranged on the other surface; detecting a light intensity around a surface where the second display unit is arranged; and in a case that a detected light intensity reaches a predetermined light intensity, adjusting at least display effect of the second display unit to reduce a light transmittance of the second display unit.

18 Claims, 5 Drawing Sheets

(51) Int. Cl.
*H04N 5/57* (2006.01)
*H04N 9/73* (2006.01)
*G06F 3/14* (2006.01)

(56) References Cited

U.S. PATENT DOCUMENTS

| | | | |
|---|---|---|---|
| 8,295,892 B2 | 10/2012 | Kim et al. | |
| 8,314,859 B2 | 11/2012 | Kim et al. | |
| 8,350,814 B2 | 1/2013 | Kim et al. | |
| 8,649,824 B2 | 2/2014 | Choi | |
| 8,767,145 B1* | 7/2014 | Zhang | G02F 1/13471 349/114 |
| 9,215,306 B2 | 12/2015 | Kim et al. | |
| 9,310,918 B2 | 4/2016 | Xu et al. | |
| 2005/0041009 A1* | 2/2005 | Kuroda | G02F 1/1335 345/102 |
| 2008/0006762 A1* | 1/2008 | Fadell | G01J 1/4204 250/201.1 |
| 2009/0295731 A1 | 12/2009 | Kim et al. | |
| 2009/0295943 A1 | 12/2009 | Kim et al. | |
| 2009/0298537 A1 | 12/2009 | Choi | |
| 2009/0298546 A1 | 12/2009 | Kim et al. | |
| 2009/0298547 A1 | 12/2009 | Kim et al. | |
| 2009/0298548 A1 | 12/2009 | Kim et al. | |
| 2009/0298554 A1 | 12/2009 | Kim et al. | |
| 2011/0280004 A1* | 11/2011 | Shimada | G02B 3/0056 362/97.1 |
| 2013/0285981 A1* | 10/2013 | Xu | G06F 3/0412 345/174 |
| 2014/0043377 A1* | 2/2014 | Tanaka | G02B 6/0053 345/690 |

FOREIGN PATENT DOCUMENTS

| | | |
|---|---|---|
| CN | 101594427 B | 5/2014 |
| EP | 1510994 A1 | 3/2005 |
| WO | WO-2014149036 A1 | 9/2014 |

\* cited by examiner

CONTROL METHOD, CONTROL DEVICE AND ELECTRONIC APPARATUS

CROSS-REFERENCE TO RELATED APPLICATIONS

This application claims priority to Chinese Patent Application No. 201510479311.5 titled "CONTROL METHOD, CONTROL DEVICE AND ELECTRONIC APPARATUS", filed with the Chinese Patent Office on Aug. 3, 2015, which is hereby incorporated by reference in its entirety.

TECHNICAL FIELD

The disclosure relates to the technical field of electronic apparatus, and particularly to a control method, a control device and an electronic apparatus.

BACKGROUND

To meet user demands, an electronic apparatus with two display units appears currently. A display unit is arranged on each of the two surfaces of the electronic apparatus, where the two surfaces are opposite to each other. Inherent light transmittances of the two display units are high, such that the electronic apparatus may appear to be transparent or nearly transparent.

However, when a user views one of the display units of the electronic apparatus, if the other display unit of the electronic apparatus is under high-light exposure, viewing experience of the user may be influenced, or even overstimulation may be caused to the user eyes.

SUMMARY

In view of this, the disclosure is intended to provide a control method, a control device and an electronic apparatus, to enhance viewing experience of the user and reduce stimulation to the user eyes when the user views the display unit of the electronic apparatus under high-light exposure.

To achieve the above objective, the following technical solutions are provided in the disclosure.

A control method applied to an electronic apparatus is provided in the disclosure. The electronic apparatus includes a display unit arranged on a first surface and a display unit arranged on a second surface, the first surface and the second surface are opposite to each other, and inherent light transmittances of the display units of the electronic apparatus are greater than a predetermined value. The control method includes:

determining a first display unit and a second display unit, where the first display unit is a display unit arranged on a surface facing a user, and the second display unit is a display unit arranged on the other surface;

detecting a light intensity around a surface where the second display unit is arranged; and adjusting at least display effect of the second display unit, in order to reduce a light transmittance of the second display unit, in a case that a detected light intensity reaches a predetermined light intensity.

Preferably, in the control method, the adjusting at least display effect of the second display unit includes adjusting display effect of a target display area in the second display unit, where the target display area is an entire display area or a partial display area in the second display unit.

Preferably, in the control method, the adjusting the display effect of the target display area in the second display unit includes: adjusting a display color of the target display area in the second display unit to a first color, in order to reduce a light transmittance of the target display area in the second display unit; or adjusting a transparency of the target display area in the second display unit to a first value, in order to reduce a light transmittance of the target display area in the second display unit.

Preferably, in the control method, the detecting the light intensity around the surface where the second display unit is arranged includes: determining a visible space which the user is able to observe through the first display unit; detecting whether there is a light source in the visible space; and detecting an intensity of a light generated at the electronic apparatus by the light source in a case that there is a light source in the visible space.

Preferably, in the control method, the determining the visible space which the user is able to observe through the first display unit includes: determining positions of eyes of the user relative to the first display unit; and determining the visible space which the user is able to observe through the first display unit based on the positions of eyes of the user relative to the first display unit and a size of the second display unit.

Preferably, in the control method, the adjusting at least the display effect of the second display unit includes: determining intersection points at which lines that are formed by connecting the two eyes of the user and the light source extend to intersect with the second display unit; determining specific regions centered on the intersection points in the second display unit as target adjustment regions; and adjusting display effect of the target adjustment regions in the second display unit.

Preferably, in the control method, the adjusting the display effect of the target adjustment regions in the second display unit includes: adjusting a display color of the target adjustment regions in the second display unit to a first color, in order to reduce a light transmittance of the target adjustment regions in the second display unit; or adjusting a transparency of the target adjustment regions in the second display unit to a first value, in order to reduce a light transmittance of the target adjustment regions in the second display unit.

Preferably, in the control method, the determining the first display unit and the second display unit includes: controlling an image acquisition device arranged on the first surface and an image acquisition device arranged on the second surface to acquire an image; and determining a display unit on the surface where an image acquisition device acquiring a user image is provided as the first display unit, and determining the other display unit as the second display unit.

In another aspect, a control device applied to an electronic apparatus is provided in the disclosure. The electronic apparatus includes a display unit arranged on a first surface and a display unit arranged on a second surface, the first surface and the second surface are opposite to each other, and inherent light transmittances of the display units of the electronic apparatus are greater than a predetermined value. The control device includes:

a state determination unit, configured to determine a first display unit and a second display unit, where the first display unit is a display unit arranged on a surface facing a user, and the second display unit is a display unit arranged on the other surface;

a light-intensity detection unit, configured to detect a light intensity around a surface where the second display unit is arranged; and a processing unit, configured to adjust at least display effect of the second display unit, in order to reduce a light transmittance of the second display unit, in a case that a light intensity detected through the light-intensity detection unit reaches a predetermined light intensity.

Preferably, in the control device, the processing unit includes a first adjustment module, where the first adjustment module is configured to adjust display effect of a target display area in the second display unit, and the target display area is an entire display area or a partial display area in the second display unit.

Preferably, in the control device, the first adjustment module is configured to adjust a display color of the target display area in the second display unit to a first color, in order to reduce a light transmittance of the target display area in the second display unit; or adjust a transparency of the target display area in the second display unit to a first value, in order to reduce a light transmittance of the target display area in the second display unit.

Preferably, in the control device, the light-intensity detection unit includes: a visible space determination module, configured to determine a visible space which the user is able to observe through the first display unit; a light source detection module, configured to detect whether there is a light source in the visible space; and a light intensity detection module, configured to detect an intensity of a light generated at the electronic apparatus by the light source, in a case that there is a light source in the visible space.

Preferably, in the control device, the visible space determination module is configured to:

determine positions of eyes of the user relative to the first display unit; and determine a visible space which the user is able to observe through the first display unit based on the positions of eyes of the user relative to the first display unit and a size of the second display unit.

Preferably, in the control device, the processing unit includes: an intersection point determination module, configured to determine determining intersection points at which lines that are formed by connecting the two eyes of the user and the light source extend to intersect with the second display unit; a target adjustment region determination module, configured to determine specific regions centered on the intersection points in the second display unit as target adjustment regions; and a second adjustment module, configured to adjust display effect of the target adjustment regions in the second display unit.

Preferably, in the control device, the second adjustment module is configured to adjust a display color of the target adjustment regions in the second display unit to a first color, in order to reduce a light transmittance of the target adjustment regions in the second display unit; or adjust a transparency of the target adjustment regions in the second display unit to a first value, in order to reduce a light transmittance of the target adjustment regions in the second display unit.

Preferably, in the control device, the state determination unit includes: a control module, configured to control an image acquisition device arranged on the first surface and an image acquisition device arranged on the second surface to acquire an image; and a state determination module, configured to determine a display unit on a surface where an image acquisition device acquiring a user image is provided as the first display unit, and determine the other display unit as the second display unit.

In still another aspect, an electronic apparatus is provided in the disclosure. The electronic apparatus includes a display unit arranged on a first surface and a display unit arranged on a second surface, where the first surface and the second surface are opposite to each other, inherent light transmittances of the display units of the electronic apparatus are greater than a predetermined value, and the electronic apparatus further includes any one of control devices mentioned above.

As can be seen, beneficial effects of the disclosure is as follows. In the control method applied to the electronic apparatus provided in the disclosure, the first display unit (the display unit arranged on the surface facing the user) and the second display unit (the display unit arranged on the other surface) among the two display units is determined during operation of the electronic apparatus, and in a case that the light intensity around the surface where the second display unit is arranged reaches the predetermined light intensity, the display effect of the second display unit is adjusted to reduce the light transmittance of the second display unit, thus the intensity of the light passing through the second display unit and the first display unit is reduced. Viewing experience of the user is further enhanced, and stimulation to the user eyes is reduced.

BRIEF DESCRIPTION OF THE DRAWINGS

The drawings to be used in the description of embodiments or the conventional technology are described briefly hereinafter, so that technical solutions according to the embodiments of the disclosure or conventional technology may become clearer. Apparently, the drawings in the following description only are some embodiments of the disclosure. For those skilled in the art, other drawings may be obtained based on these drawings without any creative work.

DETAILED DESCRIPTION OF THE EMBODIMENTS

Technical solutions according to embodiments of the disclosure are described clearly and completely hereinafter in conjunction with the drawings. Apparently, the described embodiments are only a part of rather than all of the embodiments of the disclosure. All other embodiments obtained by those skilled in the art based on the embodiments of the disclosure without any creative work fall within the protection scope of the disclosure.

A control method applied to an electronic apparatus is provided in the disclosure. The electronic apparatus includes a first surface and a second surface which are opposite to each other. Display units are provided on the first surface and the second surface of the electronic apparatus respectively, and inherent light transmittances of two display units of the electronic apparatus are larger than a predetermined value, in other words, the electronic apparatus can appear to be transparent or nearly transparent. The electronic apparatus may be a transparent mobile phone. Based on the control method provided in the disclosure, viewing experience of the user may be enhanced and stimulation to the user eyes may be reduced when the user views the display unit of the electronic apparatus under high-light exposure.

Figure 1:
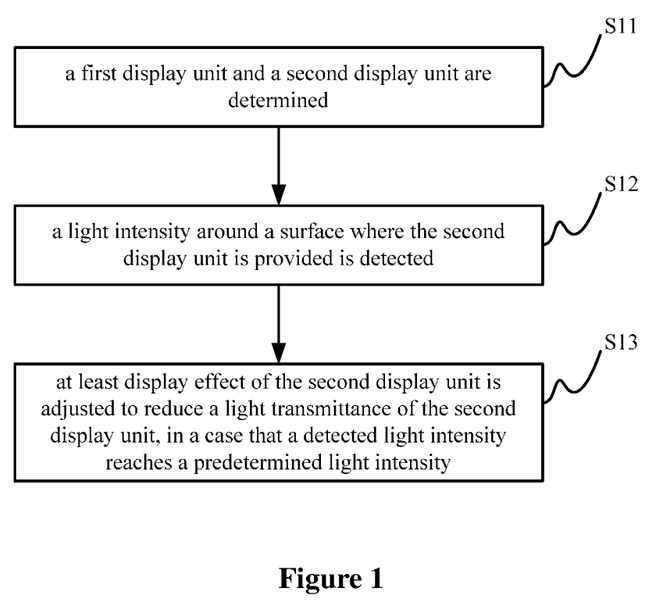
FIG. 1 is a flow chart of a control method applied to an electronic apparatus in the disclosure.

Referring to FIG. 1, a flow chart of a control method applied to an electronic apparatus in the disclosure is shown. The control method includes steps S11-S13.

In step S11, a first display unit and a second display unit are determined.

The first display unit is a display unit arranged on a surface facing a user, and the second display unit is a display unit arranged on the other surface. When the user uses the electronic apparatus, only one of the first surface and the second surface faces the user, thus, for convenience, the display unit arranged on the surface facing the user is referred to as the first display unit, and the display unit arranged on the other surface is referred to as the second display unit.

In step S12, a light intensity around a surface where the second display unit is arranged is detected.

In step S13, at least display effect of the second display unit is adjusted to reduce a light transmittance of the second display unit, in a case that a detected light intensity reaches a predetermined light intensity.

In a case that the light intensity around the surface where the second display unit is arranged reaches the predetermined light intensity, and the light transmittance of the second display unit is high, high intensity light may pass through the second display unit and the first display unit and enter into the user eyes, which may make it difficult for the user to clearly view an image displayed on the first display unit and cause discomfort to the user eyes. In this case, the display effect of the second display unit is adjusted to reduce the light transmittance of the second display unit, thus the intensity of the light passing through the second display unit and the first display unit is reduced.

In the control method applied to the electronic apparatus provided in the disclosure, the first display unit (the display unit arranged on the surface facing the user) and the second display unit (the display unit arranged on the other surface) among the two display units is determined during operation of the electronic apparatus, and in a case that the light intensity around the surface where the second display unit is arranged reaches the predetermined light intensity, the display effect of the second display unit is adjusted to reduce the light transmittance of the second display unit, thus the intensity of the light passing through the second display unit and the first display unit is reduced. Viewing experience of the user is further enhanced, and stimulation to the user eyes is reduced.

In an implementation, in a case that a light sensor is configured on the surface where the second display unit of the electronic apparatus is provided, the light intensity around the surface where the second display unit is arranged may be determined through the light sensor, and a value detected through the light sensor may be used as the light intensity around the surface where the second display unit is arranged. In a case that a plurality of light sensors are configured on the surface where the second display unit of the electronic apparatus is provided, a mean value of the values detected through the plurality of light sensors may be calculated as the light intensity around the surface where the second display unit is arranged. In addition, in a case that an image acquisition device is configured on the surface where the second display unit of the electronic apparatus is provided, the light intensity around the surface where the second display unit is arranged may be determined based on an image acquired through the image acquisition device.

In addition, in the control method of the disclosure, the display effect of the second display unit may be adjusted through adjusting display effect of a target display area in the second display unit, where the target display area is an entire display area or a partial display area in the second display unit.

As an implementation, adjusting the display effect of the target display area in the second display unit includes: adjusting a display color of the target display area in the second display unit to a first color, in order to reduce a light transmittance of the target display area in the second display unit. The first color is a color with lower color purity and lower brightness, such as black and dark blue. The intensity of the light passing through the target display area in the second display unit can be reduced by means of adjusting the display color of the target display area in the second display unit to the first color.

As another implementation, adjusting the display effect of the target display area in the second display unit includes: adjusting a transparency of the target display area in the second display unit to a first value, in order to reduce a light transmittance of the target display area in the second display unit. A transparency of a display object may ranges from 0% to 100%. The higher the transparency of the display object is, the more transparently the display object appears. In the implementation, the first value may be but not limited to values lower than 20%. The intensity of the light passing through the target display area in the second display unit can be reduced by means of adjusting the transparency of the target display area in the second display unit to a lower value.

In an implementation, adjusting the display effect of the target display area in the second display unit may include: adjusting the display color of the target display area in the second display unit to a first color, and adjusting the transparency of the target display area in the second display unit to a first value. The intensity of the light passing through the target display area in the second display unit can be furthest reduced by means of adjusting the display color and the transparency of the target display area in the second display unit.

In other words, in a case that the light intensity around the surface where the second display unit is arranged reaches the predetermined light intensity, a display color of an entire display area or a partial display area in the second display unit may be adjusted to a first color, or a transparency of an entire display area or a partial display area in the second display unit may be adjusted to a first value, or else, the display color of an entire display area or a partial display area in the second display unit may be adjusted to the first color, and the transparency of an entire display area or a partial display area in the second display unit may be adjusted to the first value as well.

In an implementation, the step of detecting the light intensity around the surface where the second display unit is arranged and the step of adjusting the display effect of the second display unit may be implemented in other ways. It is illustrated hereinafter in conjunction with FIG. 2.

Figure 2:
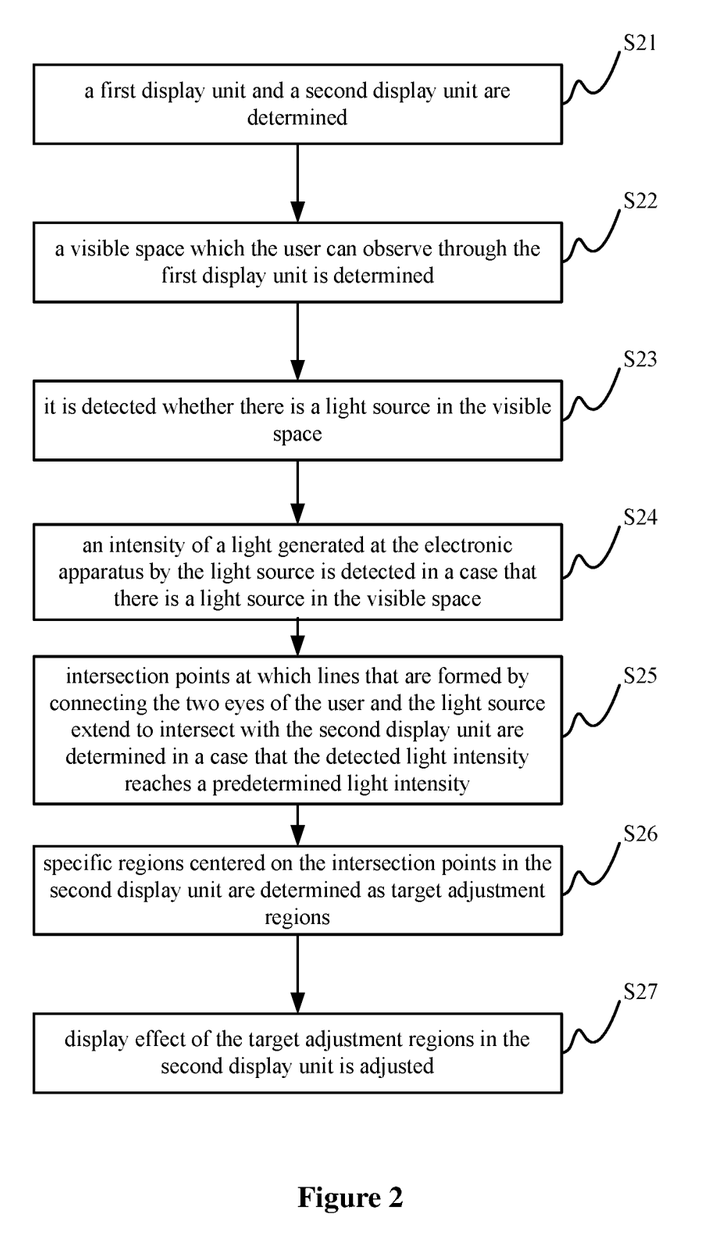
FIG. 2 is a flow chart of a control method applied to an electronic apparatus in the disclosure.

Referring to FIG. 2, a flow chart of a control method applied to an electronic apparatus in the disclosure is shown. The control method includes steps S21-S27.

In step S21, a first display unit and a second display unit are determined.

In step S22, a visible space which the user can observe through the first display unit is determined.

When the user holds the electronic apparatus in his/her hand, a space which the user can observe through the first display unit of the electronic apparatus is only a part of an entire space which the second display unit faces. This part of space is the visible space which the user can observe through the first display unit.

In an implementation, the visible space which the user can observe through the first display unit may be determined in this way: determining positions of user eyes relative to the first display unit; and determining the visible space which the user can observe through the first display unit based on the positions of user eyes relative to the first display unit and a size of the second display unit.

The positions of user eyes relative to the first display unit includes: distances between the user eyes and the first display unit, heights of the user eyes relative to a specific point (e.g., a center point) in the first display unit, and horizontal distances between the user eyes and the specific point.

As an implementation, the positions of user eyes relative to the first display unit may be determined through an image acquisition device configured on the surface where the first display unit is arranged. In a case that an image acquisition device and a depth sensor are configured on the surface where the first display unit of the electronic apparatus is provided, the distances between the user eyes and the first display unit may be detected through the depth sensor, and the heights of user eyes relative to the specific point in the first display unit and the horizontal distances between the user eyes and the specific point may de determined based on an image acquired through the image acquisition device.

An example is taken for illustration.

Figure 3:
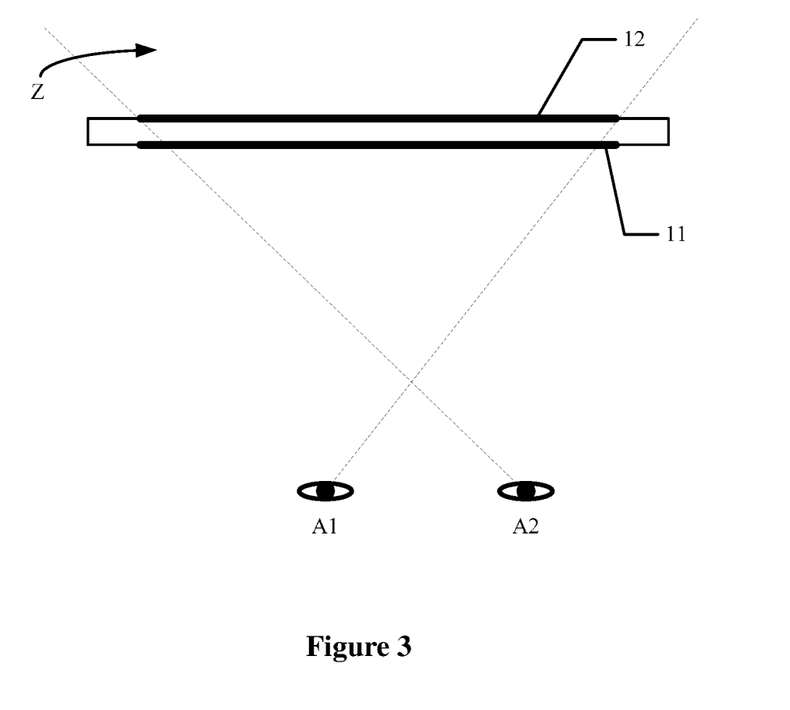
FIG. 3 is a diagram of a scenario where the user views the electronic apparatus from above.

The positions of user eyes relative to the first display unit may be expressed with coordinates of the user eyes in a pre-constructed three-dimensional coordinate system. For example, it is pre-defined that an origin of the three-dimensional coordinate system is a center point of the first display unit, an x-axis of the three-dimensional coordinate system extends to the right in the horizontal direction (from a perspective of the user), a y-axis of the three-dimensional coordinate system extends upwards in the vertical direction, and a z-axis of the three-dimensional coordinate system extends from the electronic apparatus to the user. In an application, the image is acquired through the image acquisition device configured on the surface where the first display unit of the electronic apparatus is provided, and the acquired image is analyzed, in order to determine the coordinates of the user eyes in the pre-constructed three-dimensional coordinate system. A scenario shown in FIG. 3 is taken as an example. A position of a left eye A1 of the user relative to a first display unit 11 is expressed with (x1,y1,z1), and a position of a right eye A2 of the user relative to the first display unit 11 may be expressed with (x2,y2,z2).

Figure 4:
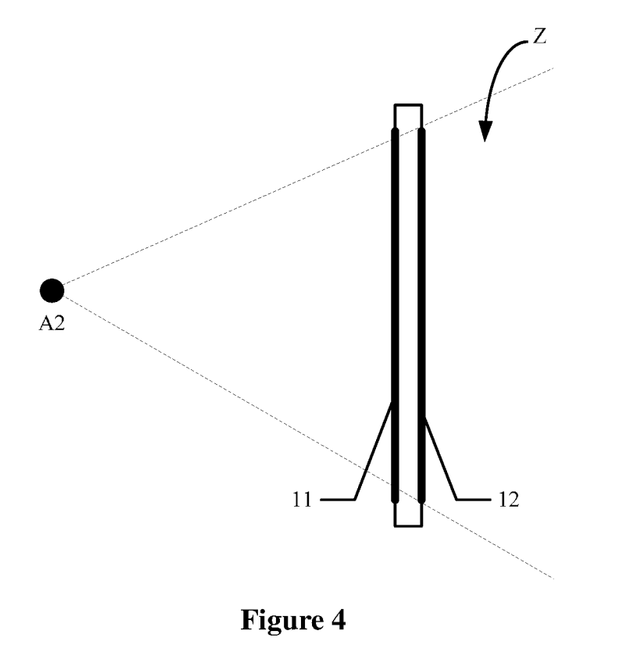
FIG. 4 is a diagram of a scenario where the user views the electronic apparatus from left.

A size of a second display unit 12 of the electronic apparatus is known, and a position relationship between the second display unit 12 and the first display unit 11 is known, therefore coordinates of four sides of the second display unit 12 in the pre-constructed three-dimensional coordinate system may be determined. Then, the visible space which the user eyes can observe through the first display unit 11 may be determined based on two coordinates corresponding to the user eyes and coordinates corresponding to the four sides of the second display unit 12, as shown in FIG. 3 and FIG. 4 marked with Z.

In step S23, it is detected whether there is a light source in the visible space.

In an implementation, the image may be acquired through the image acquisition device configured on the surface where the second display unit of the electronic apparatus is provided. In a case that the acquired image includes the light source, the image is analyzed to determine a position of the light source, and it is determined whether the light source is in the visible space.

In step S24, an intensity of a light generated at the electronic apparatus by the light source is detected in a case that there is a light source in the visible space.

If there is a light source in the visible space which the user can observe through the first display unit, the light source may influence the user viewing. In this case, the intensity of the light generated at the electronic apparatus by the light source is detected. Specifically, the light intensity may be detected through the light sensor configured on the surface where the first display unit of the electronic apparatus is provided.

In step S25, intersection points at which lines that are formed by connecting the two eyes of the user and the light source extend to intersect with the second display unit are determined in a case that the detected light intensity reaches a predetermined light intensity.

In step S26, specific regions centered on the intersection points in the second display unit are determined as target adjustment regions.

In step S27, display effect of the target adjustment regions in the second display unit is adjusted.

The intersection points at which lines that are formed by connecting the two eyes of the user and the light source extend to intersect with the second display unit may be determined based on positions of the light source and the user eyes. The specific regions centered on two intersection points in the second display unit may be determined as the target adjustment regions. Then the display effect of the two target adjustment regions in the second display unit may be adjusted. As an implementation, specific rectangular regions or circular regions centered on the intersection points in the second display unit may be determined as the target adjustment regions.

In implementations, the display effect of the target adjustment regions in the second display unit may be adjusted through adjusting a display color of the target adjustment regions in the second display unit to a first color, in order to reduce a light transmittance of the target adjustment regions in the second display unit, or through adjusting a transparency of the target adjustment regions in the second display unit to a first value, in order to reduce a light transmittance of the target adjustment regions in the second display unit, where the first color and the first value may be set as described above and is not repeated herein.

In the control method applied to an electronic apparatus shown in FIG. 2, a first display unit and a second display unit are determined, then a visible space which the user can observe through the first display unit is determined, and it is detected whether there is a light source in the visible space. If there is a light source within the visible space and an intensity of a light generated at the electronic apparatus by the light source reaches a predetermined light intensity, intersection points at which lines that are formed by connecting the two eyes of the user and the light source extend to intersect with the second display unit are determined, and the display effect of two specific regions centered on the intersection points in the second display unit are adjusted. Compared with the control method shown in FIG. 1, in the control method shown in FIG. 2, only the display effect of the region in the second display unit influenced by the light source is adjusted, in order to reduce the intensity of the light passing through the second display unit and the first display unit, while other regions in the second display unit keep original display effect.

In implementations, in a case that the light intensity around the surface where the second display unit is arranged is detected with the method shown in FIG. 2, the display effect of the second display unit may be adjusted in other ways provided in the disclosure if the detected light intensity reaches a predetermined light intensity.

In the control methods applied to an electronic apparatus mentioned above in the disclosure, in a case that an image acquisition device is configured on both the first surface and the second surface of the electronic apparatus, the first display unit and the second display unit may be determined through: controlling an image acquisition device arranged on the first surface and an image acquisition device arranged on the second surface to acquire an image; and determining a display unit on a surface where an image acquisition device acquiring a user image is provided as the first display unit, and determining the other display unit as the second display unit.

In implementations, the first display unit and the second display unit of the electronic apparatus may be determined in other ways. For example, a user usually performs a touch operation on the display unit opposite to himself/herself. Therefore, the number of touch operations received by two display units in a predetermined period may be counted, a display unit with a larger number of received touch operations may be determined as the first display unit, and the other display unit may be determined as the second display unit.

A control method applied to an electronic apparatus is provided in the disclosure. Correspondingly, a control device applied to an electronic apparatus is further provided in the disclosure. The electronic apparatus includes a first surface and a second surface which are opposite to each other. A display unit is arranged on both the first surface and the second surface of the electronic apparatus, and inherent light transmittances of the two display units of the electronic apparatus are greater than a predetermined value, in other words, the electronic apparatus can appear to be transparent or nearly transparent. The electronic apparatus may be a transparent mobile phone.

Figure 5:
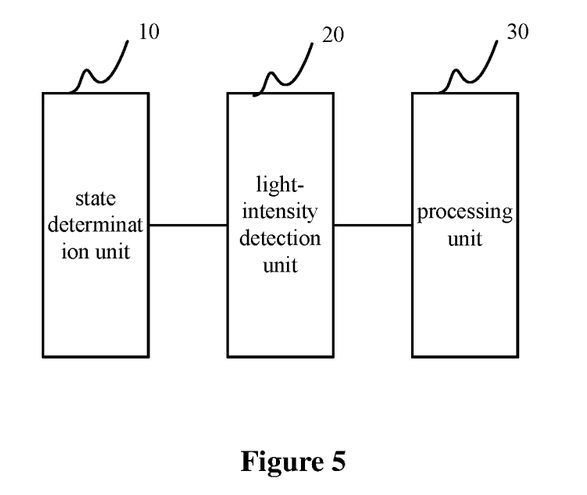
FIG. 5 is a structural diagram of a control device applied to the electronic apparatus in the disclosure.

Referring to FIG. 5, a structural diagram of a control device applied to the electronic apparatus in the disclosure is shown. The control device includes a state determination unit 10, a light-intensity detection unit 20 and a processing unit 30.

The state determination unit 10 is configured to determine a first display unit and a second display unit, where the first display unit is a display unit arranged on a surface facing a user, and the second display unit is a display unit arranged on the other surface.

The light-intensity detection unit 20 is configured to detect a light intensity around the surface where the second display unit is arranged.

The processing unit 30 is configured to, in a case that a light intensity detected through the light-intensity detection unit reaches a predetermined light intensity, adjust at least display effect of the second display unit, in order to reduce a light transmittance of the second display unit.

In the control device applied to the electronic apparatus provided in the disclosure, the first display unit (the display unit arranged on the surface facing the user) and the second display unit (the display unit arranged on the other surface) among the two display units is determined during operation of the electronic apparatus, and in a case that the light intensity around the surface where the second display unit is arranged reaches the predetermined light intensity, the display effect of the second display unit is adjusted to reduce the light transmittance of the second display unit, thus the intensity of the light passing through the second display unit and the first display unit is reduced. Viewing experience of the user is further enhanced, and stimulation to the user eyes is reduced.

As an implementation, in a case that a light sensor is configured on the surface where the second display unit of the electronic apparatus is provided, the light intensity around the surface where the second display unit is arranged may be determined through the light sensor, and the light-intensity detection unit 20 uses a value detected through the light sensor as the light intensity around the surface where the second display unit is arranged. In a case that a plurality of light sensors are configured on the surface where the second display unit of the electronic apparatus is provided, the light-intensity detection unit 20 may calculate a mean value of the values detected through the plurality of light sensors as the light intensity around the surface where the second display unit is arranged. In addition, in a case that an image acquisition device is configured on the surface where the second display unit of the electronic apparatus is provided, the light-intensity detection unit 20 may determine the light intensity around the surface where the second display unit is arranged based on an image acquired through the image acquisition device.

The processing unit 30 may include a first adjustment module. The first adjustment module is configured to adjust display effect of a target display area in the second display unit, where the target display area is an entire display area or a partial display area in the second display unit.

In implementations, the first adjustment module is configured to adjust a display color of the target display area in the second display unit to a first color, in order to reduce a light transmittance of the target display area in the second display unit; or adjust a transparency of the target display area in the second display unit to a first value, in order to reduce a light transmittance of the target display area in the second display unit. Of course, the first adjustment module may alternatively adjust a display color of the target display area in the second display unit to a first color, and adjust a transparency of the target display area to a first value as well.

Figure 6:
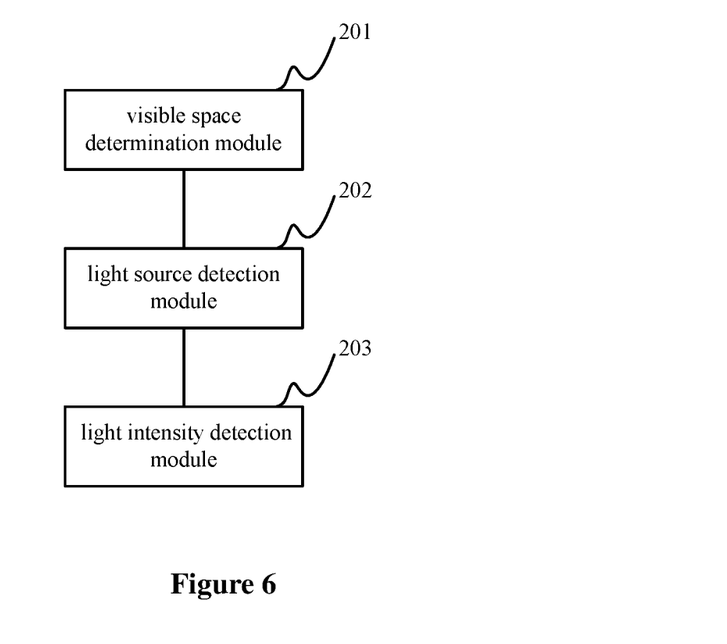
FIG. 6 is a structural diagram of a light intensity detection unit in the control device shown in FIG. 5.

As another implementation, a structure of the light-intensity detection unit 20 is shown in FIG. 6. The light-intensity detection unit 20 includes a visible space determination module 201 configured to determine a visible space which a user can observe through the first display unit; a light source detection module 202 configured to detect whether there is a light source in the visible space determined by the visible space determination module; and a light intensity detection module 203 configured to detect an intensity of a light generated at the electronic apparatus by the light source in a case that there is a light source in the visible space.

The visible space determination module 201 is configured to determine positions of the user eyes relative to the first display unit; and then determine a visible space which a user can observe through the first display unit based on the positions of the user eyes relative to the first display unit and a size of the second display unit.

Figure 7:
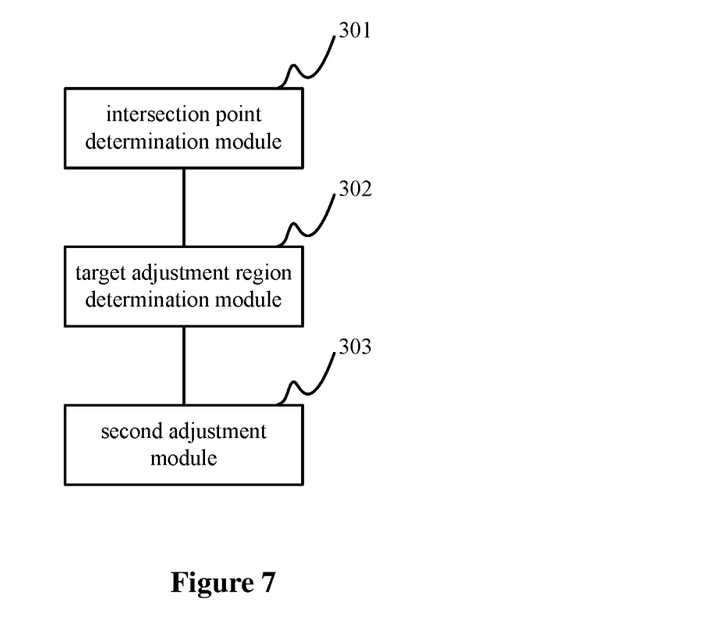
FIG. 7 is a structural diagram of a processing unit in the control device shown in FIG. 5.

In a case that the light-intensity detection unit 20 adopts the structure shown in FIG. 6, the processing unit 30 may adopt the structure shown in FIG. 7, including an intersection point determination module 301 configured to determine intersection points at which lines that are formed by connecting the two eyes of the user and the light source extend to intersect with the second display unit; a target adjustment region determination module 302 configured to determine specific regions centered on the intersection points in the second display unit as target adjustment regions; and a second adjustment module 303 configured to adjust display effect of the target adjustment regions in the second display unit.

The second adjustment module 303 is configured to adjust a display color of the target adjustment regions in the second display unit to a first color, in order to reduce a light transmittance of the target adjustment regions in the second display unit; or adjust a transparency of the target adjustment regions in the second display unit to a first value, in order to reduce a light transmittance of the target adjustment regions in the second display unit.

In the control device provided in the disclosure, the state determination unit 10 may include: a control module configured to control an image acquisition device arranged on the first surface and an image acquisition device arranged on the second surface to acquire an image; and a state determination module configured to determine a display unit on a surface where an image acquisition device acquiring a user image is provided as the first display unit, and determine the other display unit as the second display unit.

An electronic apparatus is further provided in the disclosure. The electronic apparatus includes display units provided on a first surface and a second surface, where the first surface and the second surface are opposite to each other, and an inherent light transmittance of the display unit of the electronic apparatus is greater than a predetermined value. The electronic apparatus further includes any of the control devices mentioned above in the disclosure.

With the electronic apparatus provided in the disclosure, if the display unit is under high-light exposure in the user viewing process, the electronic apparatus may adjust the display effect of the display unit, in order to reduce the intensity of the light passing through both of the display units, thus viewing experience of the user is enhanced, and stimulation to the user eyes is alleviated.

Finally, it should be noted that, in the disclosure, relational terms such as "first" and "second" are only used to distinguish one entity or operation from the other entity or operation, and not necessarily demand or imply that there is actual relation or order among those entities and operations. Furthermore, the terms "including", "comprising", or any other variation are intended to cover a non-exclusive inclusion, so that the process, method, object or device including a series of elements includes not only these elements but also other elements which are not explicitly listed, or further includes inherent elements of the process, method, object or device. Without further limitation, the element defined by the statement "include(s) a . . . " does not exclude the case that there are other same elements in the process, method, article or device including the element.

The embodiments in the specification are described in a progressive way, each embodiment lays emphasis on differences from other embodiments, and for the same or similar parts of the embodiments, one may refer to the description of other embodiments. For the device described in the embodiments, the description is simple since it corresponds to the method described in the embodiments, and for the related parts, one may refer to the illustration of the method embodiments.

According to above description of the embodiments, those skilled in the art may implement or use the disclosure. Various modifications to the embodiments are apparent for those skilled in the art. The general principle herein can be implemented in other embodiments without departing from the spirit or scope of the disclosure. Therefore, the disclosure should not be limited to the embodiments described herein, but conforms to the widest scope in accord with the principle and novel features described herein.

The invention claimed is:

1. A control method applied to an electronic apparatus, wherein the electronic apparatus comprises a display unit arranged on a first surface and a display unit arranged on a second surface, the first surface and the second surface are opposite to each other, inherent light transmittances of the display units of the electronic apparatus are greater than a predetermined value, and the control method comprises:
   determining a first display unit and a second display unit, wherein the first display unit is a display unit arranged on the surface facing a user, and the second display unit is a display unit arranged on the other surface;
   detecting a light intensity around a surface where the second display unit is arranged; and
   adjusting at least a display effect of the second display unit, in order to reduce a light transmittance of the second display unit, in a case that a detected light intensity reaches a predetermined light intensity,
   wherein the detecting the light intensity around the surface where the second display unit is arranged comprises:
     determining a visible space which the user is able to observe through the first display unit;
     detecting whether there is a light source in the visible space; and
     detecting an intensity of a light generated at the electronic apparatus by the light source in a case that there is a light source in the visible space.

2. The control method according to claim 1, wherein:
   the adjusting at least the display effect of the second display unit comprises adjusting a display effect of a target display area in the second display unit, and
   the target display area is an entire display area or a partial display area in the second display unit.

3. The control method according to claim 2, wherein the adjusting the display effect of the target display area in the second display unit comprises:
   adjusting a display color of the target display area in the second display unit to a first color, in order to reduce a light transmittance of the target display area in the second display unit; or
   adjusting a transparency of the target display area in the second display unit to a first value, in order to reduce a light transmittance of the target display area in the second display unit.

4. The control method according to claim 1, wherein the determining the visible space which the user is able to observe through the first display unit comprises:
   determining positions of eyes of the user relative to the first display unit; and
   determining the visible space which the user is able to observe through the first display unit based on the positions of eyes of the user relative to the first display unit and a size of the second display unit.

5. The control method according to claim 1, wherein the adjusting at least the display effect of the second display unit comprises:

determining intersection points at which lines that are formed by connecting eyes of the user and the light source extend to intersect with the second display unit;

determining specific regions centered on the intersection points in the second display unit as target adjustment regions; and adjusting display effect of the target adjustment regions in the second display unit.

6. The control method according to claim 5, wherein the adjusting the display effect of the target adjustment regions in the second display unit comprises:

adjusting a display color of the target adjustment regions in the second display unit to a first color, in order to reduce a light transmittance of the target adjustment regions in the second display unit; or adjusting a transparency of the target adjustment regions in the second display unit to a first value, in order to reduce a light transmittance of the target adjustment regions in the second display unit.

7. The control method according to claim 1, wherein the determining the first display unit and the second display unit comprises:

controlling an image acquisition device arranged on the first surface and an image acquisition device arranged on the second surface to acquire an image; and determining a display unit on the surface where an image acquisition device acquiring a user image is provided as the first display unit, and determining the other display unit as the second display unit.

8. A control device applied to an electronic apparatus, wherein the electronic apparatus comprises a display unit arranged on a first surface and a display unit arranged on a second surface, the first surface and the second surface are opposite to each other, inherent light transmittances of the display units of the electronic apparatus are greater than a predetermined value, and the control device comprises:

a state determination unit, configured to determine a first display unit and a second display unit, wherein the first display unit is a display unit arranged on the surface facing a user, and the second display unit is a display unit arranged on the other surface;

a light-intensity detection unit, configured to detect a light intensity around a surface where the second display unit is arranged; and a processing unit, configured to, in a case that a light intensity detected through the light-intensity detection unit reaches a predetermined light intensity, adjust at least display effect of the second display unit, in order to reduce a light transmittance of the second display unit, wherein the light intensity detection unit comprises:

a visible space determination module, configured to determine a visible space which the user is able to observe through the first display unit;

a light source detection module, configured to detect whether there is a light source in the visible space; and a light intensity detection module, configured to detect an intensity of a light generated at the electronic apparatus by the light source, in a case that there is a light source in the visible space.

9. The control device according to claim 8, wherein:

the processing unit comprises a first adjustment module, the first adjustment module is configured to adjust display effect of a target display area in the second display unit, and the target display area is an entire display area or a partial display area in the second display unit.

10. The control device according to claim 9, wherein the first adjustment module is configured to:

adjust a display color of the target display area in the second display unit to a first color, in order to reduce a light transmittance of the target display area in the second display unit; or adjust a transparency of the target display area in the second display unit to a first value, in order to reduce a light transmittance of the target display area in the second display unit.

11. The control device according to claim 8, wherein the visible space determination module is configured to:

determine positions of eyes of the user relative to the first display unit; and determine a visible space which the user is able to observe through the first display unit based on the positions of eyes of the user relative to the first display unit and a size of the second display unit.

12. The control device according to claim 8, wherein the processing unit comprises:

an intersection point determination module, configured to determine intersection points at which lines that are formed by connecting eyes of the user and the light source extend to intersect with the second display unit;

a target adjustment region determination module, configured to determine specific regions centered on the intersection points in the second display unit as target adjustment regions; and a second adjustment module, configured to adjust display effect of the target adjustment regions in the second display unit.

13. The control device according to claim 12, wherein the second adjustment module is configured to:

adjust a display color of the target adjustment regions in the second display unit to a first color, in order to reduce a light transmittance of the target adjustment regions in the second display unit; or adjust a transparency of the target adjustment regions in the second display unit to a first value, in order to reduce a light transmittance of the target adjustment regions in the second display unit.

14. The control device according to claim 8, wherein the state determination unit comprises:

a control module, configured to control an image acquisition device arranged on the first surface and an image acquisition device arranged on the second surface to acquire an image; and a state determination module, configured to determine a display unit on a surface where an image acquisition device acquiring a user image is provided as the first display unit, and determine the other display unit as the second display unit.

15. An electronic apparatus, comprising a display unit arranged on a first surface and a display unit arranged on a second surface, wherein the first surface and the second surface are opposite to each other, inherent light transmittances of the display units of the electronic apparatus are greater than a predetermined value, and the electronic apparatus further comprises a control device according to claim 8.

16. The control method according to claim 4, wherein the adjusting at least the display effect of the second display unit comprises:

determining points at which lines, each of which is defined by the light source and respective one of the eyes of the user, intersect with the second display unit;

determining specific regions centered on the intersection points in the second display unit as target adjustment regions; and adjusting display effect of the target adjustment regions in the second display unit.

17. The control device according to claim 11, wherein the processing unit comprises:

an intersection point determination module, configured to determine intersection points at which lines that are formed by connecting the eyes of the user and the light source extend to intersect with the second display unit;

a target adjustment region determination module, configured to determine specific regions centered on the intersection points in the second display unit as target adjustment regions; and a second adjustment module, configured to adjust display effect of the target adjustment regions in the second display unit.

18. An electronic apparatus, comprising a display unit arranged on a first surface and a display unit arranged on a second surface, wherein the first surface and the second surface are opposite to each other, inherent light transmittances of the display units of the electronic apparatus are greater than a predetermined value, and the electronic apparatus further comprises a control device according to claim 9.

\* \* \* \* \*